Nov. 24, 1953    C. H. WELTY ET AL    2,660,187
FLUID PRESSURE REGULATOR STRUCTURE
Filed March 29, 1950    2 Sheets-Sheet 2

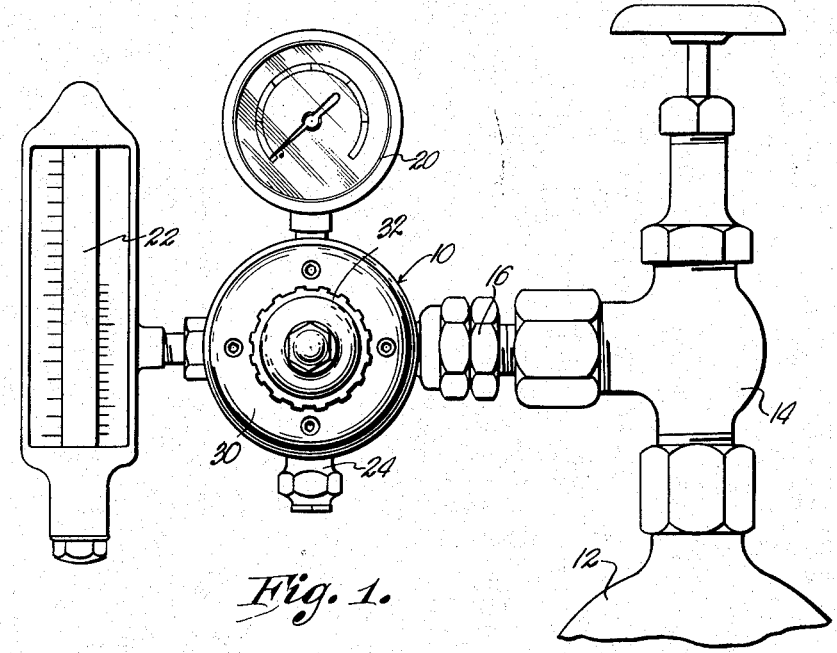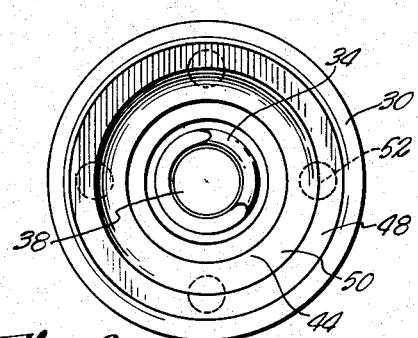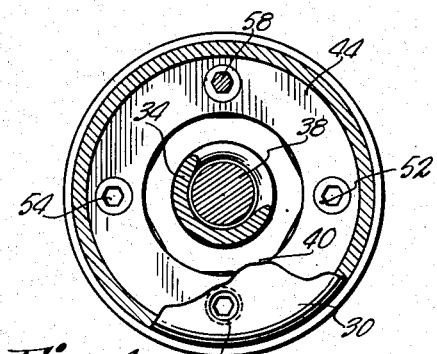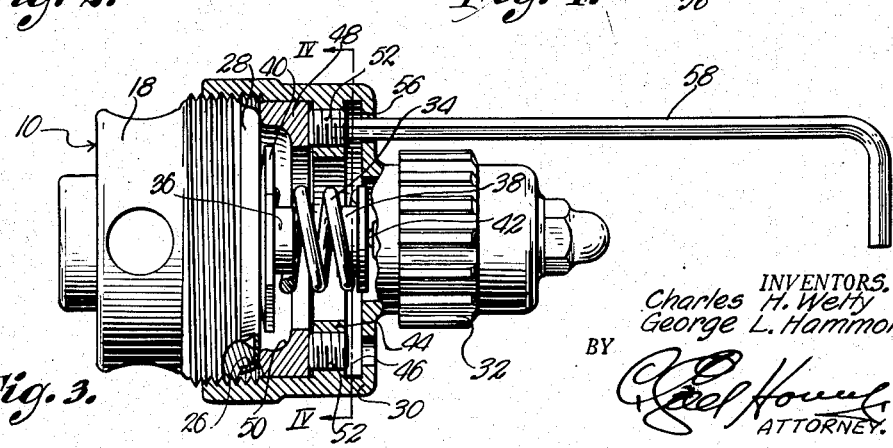

INVENTORS,
Charles H. Welty
George L. Hammon
BY
ATTORNEY.

UNITED STATES PATENT OFFICE 2,660,187

FLUID PRESSURE REGULATOR STRUCTURE

Charles H. Welty, Kansas City, Mo., and George L. Hammon, Oakland, Calif., assignors to Puritan Compressed Gas Corporation, Kansas City, Mo., a corporation of Missouri Application March 29, 1950, Serial No. 152,601

1 Claim. (Cl. 137—69)

This invention relates to the field of precision instruments and particularly with those devices commonly employed in the medical field and has to do with administration of oxygen, the primary object being to improve upon pressure regulators that are commonly employed and interposed between a storage tank for the pressurized oxygen and an administering mask.

While pressure regulators for various types of fluids are in common use today, it is appreciated that such instruments when used in connection with administering oxygen to a patient, must be manufactured with care and precision and be capable not only of operating with accuracy and efficiency but must be of such construction as to permit adjustment and assembly with comparative ease so as not to be damaged during handling.

It is accordingly the most important object of the present invention to provide a fluid pressure regulator for the purposes above set forth, having the usual flexible diaphragm therewithin and including parts for clamping the diaphragm in place exteriorly of the body within which the diaphragm is disposed and without the need of heavy, cumbersome tools that would ordinarily tend to cause damage to the instrument or adversely effect the minute adjustments of the various component parts thereof.

Another important object of the present invention is to provide a pressure regulator having a hollow body for housing a flexible diaphragm, together with a ring bearing against one face of the diaphragm for holding the latter tightly against a shoulder in the body, there being a plurality of fixtures movable against the ring and accessible by a relatively small tool, all for the purpose of clamping the diaphragm rigidly in place.

Another important object of the present invention is to provide a fluid pressure regulator having diaphragm holding means as just above set forth, together with a safety feature in the nature of openings in the body to exhaust the same of fluid in the event the diaphragm breaks or otherwise becomes damaged during use.

A further object of the present invention is the provision of a pressure regulator having a plurality of screws mounted therewithin for holding the above mentioned ring in engagement with the diaphragm, the body being provided with a tool-receiving opening for each screw respectively and an annular passageway communicating with the diaphragm and disposed between the screws and the access openings whereby the latter serve the additional function of evacuating the body and preventing damage thereto if the diaphragm should break.

Many more minor objects will be made clear or become apparent as the following specification progresses, wherein:

Figure 1 is a front elevational view of fluid pressure regulator structure made pursuant to one form of the present invention showing the same operably coupled with an oxygen supply tank.

Fig. 2 is an elevational view looking inwardly into the cap portion of the regulator with the diaphragm ring and tension spring in place therein.

Fig. 3 is a side elevational view of the regulator per se with all couplings removed, parts being broken away and in section to reveal details of construction and illustrating a screw-actuating tool in an operative position with respect thereto.

Fig. 4 is a cross-sectional view taken on line IV—IV of Fig. 3, looking in the direction of the arrows and showing a portion of one wall of the cap in elevation.

Figure 5:
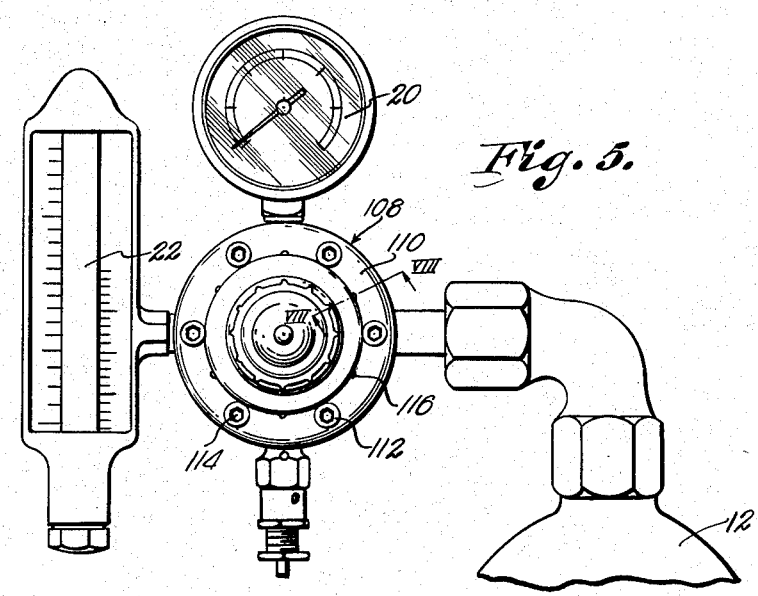
Fig. 5 is a front elevational view of a modified form of fluid pressure regulator structure made according to the present invention.

The pressure regulator constituting the preferred form of this invention is illustrated in Figs. 1 to 4 inclusive and is broadly designated by the numeral 10. In Fig. 1 of the drawings, there is illustrated fragmentarily a tank 12 commonly employed as a storage means for oxygen under pressure and having a manually operable shut-off valve 14 connected directly therewith and with the pressure regulator 10 through the medium of a coupling 16.

Pressure regulator 10 includes a hollow body 18 upon which coupling 16 is mounted. Additionally, a pressure gauge 20 of conventional character, a flow indicator 22, and an outlet nozzle 24, are all connected to and register with the interior of body 18.

The innermost end of body 18 is provided with an annular shoulder 26 that is embraced by a circular cup-shaped flexible diaphragm 28 as clearly shown in Fig. 3 of the drawings. A cup-shaped cap 30 is threadably joined with the body 18 in telescoping relationship thereto for movement toward and from the shoulder 26 and diaphragm 28 and carries an external adjusting member 32 for regulating the tension of a spring 34 within cap 30.

A pair of blocks 36 and 38 within cap 30 are disposed on opposite sides of the coil spring 34, the block 36 being threadably secured to the diaphragm 28 and including an out-turned flange 40 having a diameter less than that of the diaphragm 28. The block 38 is likewise provided with an out-turned flange for receiving the proximal end of spring 34, together with a centrally disposed seat (not shown) for receiving rotatable point 42 of adjusting member 32.

Cap 30 is provided with an annular internal shoulder 44 spaced from that wall thereof having adjusting member 32 thereon presenting an annular passageway 46. An annular ring 48 cut away as at 50 to clear flange 40 is interposed within cap 30 between diaphragm 28 and shoulder 44. A plurality of fixtures taking the form of setscrews 52, are threadably carried by the shoulder 44 and arranged in a circle as shown in Figs. 2 and 4. The setscrews or fixtures 52 are all provided with polygonal cavities 54 in the outermost ends thereof in direct alignment with the ring 48 and with openings 56 provided in that wall of cap 30 having member 32 thereon for each screw 52 respectively. Openings 56 are formed to serve as a guide for an L-shaped tool 58 that is formed in cross-section in conformity with the cavities 54.

In assembling the pressure regulator just described, the screws 52 are all first retracted toward the openings 56 through use of tool 58 and the cap 30 is mounted upon the body 18 with diaphragm 28, ring 48, spring 34 and block 38 mounted therewithin. After the cap 30 has been rotated to move the same on body 18 to a position where shoulder 44 is adjacent ring 48, screws 52 are moved against the ring 48 by use of tool 58. Such action brings the ring 48 into tight engagement with the diaphragm 28 and clamps the latter securely between ring 48 and shoulder 26. Inasmuch as openings 56 are smaller in diameter than the diameters of screws 52 whereby the same function to guide the tool 58, setscrews 52 are initially inserted into the shoulder 48 from the open end of cap 30. In the event that diaphragm 28 breaks or otherwise becomes damaged so as to permit passage of fluid into cap 30, such escaping fluid is free to flow outwardly through flange 44 and around spring 34 into annular passage 46 and thence outwardly to the atmosphere by way of the plurality of openings 56. It is seen that when the diaphragm 28 is thus clamped in place, the manual adjusting means 32 can be manipulated to vary the tension of spring 34 and thereby regulate the pressure of oxygen emanating from tank 12 in the usual manner. Cap 30 may be initially moved into place on body 18 by hand and without the use of any tools whatsoever, since tightening of the screws 52 will hold diaphragm 28 tightly in place and a relatively great amount of pressure can be brought to bear upon the ring 48 by use of the relatively small tool 58.

The modification illustrated in Figs. 5 to 8 inclusive, is essentially the same as that just above described and includes a hollow body 100, a diaphragm 102 mounted upon shoulder 104 of body 100, a relatively wide, circular ring 106 and a cup-like cap 108.

Cap 108 is threadably secured to the body 100 in housing relationship to diaphragm 102 and ring 106. Cap 108 is provided with a wall 110 for threadably receiving a plurality of fixtures 112, also taking the form of setscrews, and movable toward and away from the diaphragm 102.

Setscrews 112 are each provided with polygonal cavities 114 in the outermost ends thereof for receiving a tool such as illustrated in Fig. 3 and designated by the numeral 58. It is noted in the modification of Figs. 5 to 8 inclusive, that the setscrews 112 bear directly against one edge of the ring 106 for forcing the opposite edge thereof into contact with the diaphragm 102 and for holding the latter clamped tightly against the annular shoulder 104.

A plurality of angularly disposed openings 116 are formed in the wall 110 of cap 108 and communicate directly with the interior of ring 106 and with diaphragm 102 for evacuating cap 108 of pressurized fluid that may escape thereinto by virtue of breakage of diaphragm 102.

In assembling the pressure regulator of this modification, setscrews 112 are first retracted outwardly and the cap 108 is placed upon the body 100 with ring 106 contained therein. Cap 108 is first rotated manually to move wall 110 toward the diaphragm 102 until the ring 106 comes into relatively tight engagement with the diaphragm 102. Setscrews 112 are thereupon moved against the ring 106 to force the same still tighter against diaphragm 102 and to clamp the latter tightly between shoulder 104 and the proximal circular edge of ring 106. Here again, only a relatively small tool is needed to rigidly secure the diaphragm 102 in place and it is not necessary to use a large, heavy cumbersome tool for rotating the cap 108 as is customary in pressure regulators of conventional character.

In either of the modifications of this invention, assembling and disassembling can be accomplished quickly and easily by any user without skill and without the need of special equipment. Caps 30 and 108 in each case are maintained in their precisely formed original condition since the same cannot become damaged through mere manipulation thereof by hand. Furthermore, it has been found that through use of the fixtures herein provided, the diaphragms can be clamped in place as effectively as has heretofore been the practice, and in fact, a tighter clamping effect can be produced. Utilization of such fixtures eliminates the difficulty of attempting to clamp the diaphragm in place by rotation of the cap structure alone arising from the friction between the rotating cap and the diaphragm against which the same must rotate until the latter is fully secured in place.

It can now also be appreciated that the form of the present invention shown in Figs. 1 to 3 inclusive, is to be preferred because of the fact that the setscrews 52 are all hidden from view, and further, by virtue of the access openings 56 serving not only the function of guiding the tool 58, but of evacuating the cap 30 in the event of leakage through diaphragm 28.

Another modification constitutes a change in the form of Figs. 1 to 4 inclusive and is deemed sufficiently clear to obviate the necessity of illustration. Such change constitutes elimination of shoulder 44 and threading longer screws 52 into the ring 48. Ring 48 would thereupon be forced against diaphragm 28 by retracting screws 52 until the same become tightly wedged between ring 48 and that wall of cap 30 having openings 56 therein. In order to still utilize openings 56 as a safety factor in evacuating escaping fluids from diaphragm 28 in the event the latter became broken, transverse slots could be provided in that end of the screws 52 having cavities 54 therein.

Figure 6:
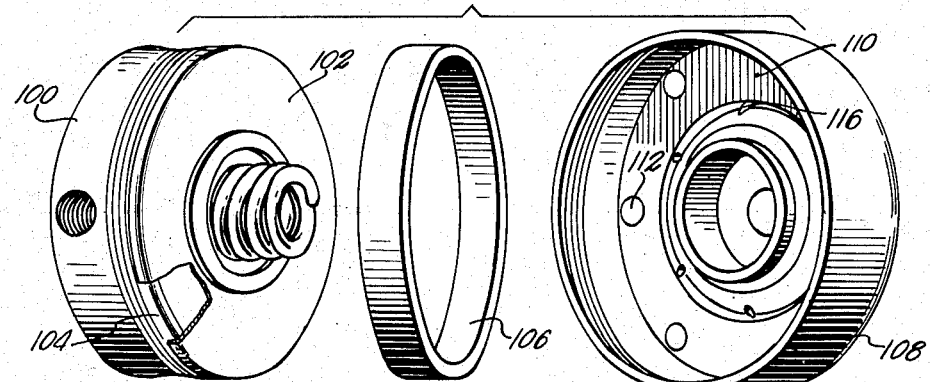
Fig. 6 is an extended, perspective view of the regulator per se, as shown in Fig. 5, with all couplings removed.
Figures 7, 8:
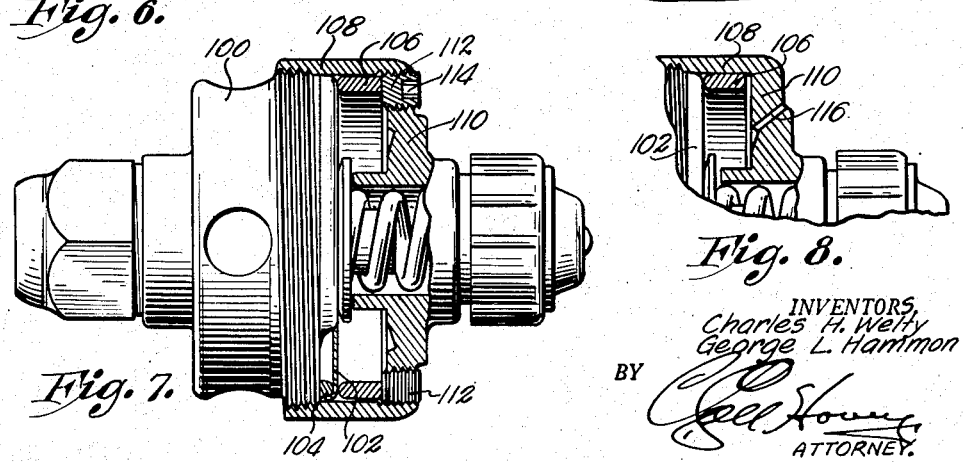
Fig. 7 is a side elevational view of the regulator per se, as shown in Fig. 5, parts being broken away and in section to reveal details of construction.
Fig. 8 is a fragmentary, detailed, cross-sectional view taken on line VIII—VIII of Fig. 5, looking in the direction of the arrows.

This last mentioned form, as well as the form of Figs. 1 to 4 inclusive, are additionally to be preferred over that of Figs. 5 to 6 inclusive because of the fact that all separate parts are confined within cap 32 and reduces the likelihood of loss or misplacement. In other words, it is possible to lose screws 112 (Fig. 7) but screws 52 cannot move outwardly through openings 56 and are always confined within cap 30.

The pressure regulator structure hereof is manifestly subject to still further changes and modifications and those that fairly come within the spirit of this invention as defined by the scope of the appended claim, are accordingly contemplated hereby.

Having thus described the invention, what is claimed as new and desired to be secured by Letters Patent is:

A fluid pressure regulator for controlling the flow of oxygen from a source of supply to a discharge line, said regulator comprising the combination of a hollow, cup-shaped body having external threads on the annular side wall, and openings formed through the side wall through which openings the interior of the body is placed into communication with a source of oxygen supply, a flow-meter, a gauge and an outlet nozzle respectively; a flexible diaphragm covering the open end of said cup-shaped body and having a flanged, marginal edge thereon and overhanging the edge of said body; a ring bearing against said diaphragm and formed to engage that portion thereof overlying the edge of said body; an internally threaded, cup-shaped cap in telescoped relation with the cup-shaped body with the screw threads of said body and said cap in interengagement, said cup-shaped cap having an inwardly directed annular flange spaced from the end wall thereof, the length of the interengaged threads of the body and the cap being great enough to permit moving the said flange against the ring to exert holding force upon that part of the diaphragm disposed between the ring and the edge of said cup-shaped body; a plurality of threaded openings formed through the flange; a threaded set-screw mounted in each opening of said flange respectively and movable by turning in one direction against the ring, whereby to supplement the pressure of the flange of the cap on the diaphragm in holding the latter in place; a series of openings in said cap, in alignment with said set-screws respectively and in communication with the interior of the cap whereby to permit escape of oxygen in event the said diaphragm breaks; and manually adjustable means carried by the end wall of the cap for holding the central portion of the diaphragm in the desired position when the annular flange is against said ring.

CHARLES H. WELTY.
GEORGE L. HAMMON.

References Cited in the file of this patent

UNITED STATES PATENTS

| Number | Name | Date |
|---|---|---|
| 1,064,714 | Deegan | June 17, 1913 |
| 1,097,595 | Roehrich | May 19, 1914 |
| 1,626,673 | Farmer | May 3, 1927 |
| 2,270,259 | Burke | Jan. 20, 1942 |

FOREIGN PATENTS

| Number | Country | Date |
|---|---|---|
| 297,216 | Great Britain | of 1928 |